United States Patent [19]

Pechhold

[11] Patent Number: 5,770,656
[45] Date of Patent: Jun. 23, 1998

[54] PARTIAL FLUOROESTERS OR THIOESTERS OF MALEIC ACID POLYMERS AND THEIR USE AS SOIL AND STAIN RESISTS

[75] Inventor: Engelbert Pechhold, Chadds Ford, Pa.

[73] Assignee: E.I. du Pont de Nemours and Company, Wilmington, Del.

[21] Appl. No.: 532,346

[22] Filed: Sep. 22, 1995

[51] Int. Cl.$^6$ .................................................. C08F 8/18
[52] U.S. Cl. .................................. 525/326.4; 525/326.5; 525/326.6; 525/327.7; 525/327.8; 525/103; 427/387; 428/447
[58] Field of Search ........................... 525/326.4, 326.5, 525/326.6, 327.7, 327.8, 103; 427/387; 428/447

[56] References Cited

U.S. PATENT DOCUMENTS

| | | | |
|---|---|---|---|
| 3,051,562 | 8/1962 | Gee et al. ................................. 44/62 |
| 3,488,311 | 1/1970 | Burdick et al. ....................... 260/29.6 |
| 3,530,101 | 9/1970 | Haynes et al. ......................... 260/78.5 |
| 3,716,401 | 2/1973 | Axelrod ................................ 525/330.6 |
| 3,753,716 | 8/1973 | Ishihara et al. ............................ 96/87 |
| 3,876,589 | 4/1975 | Wasley et al. ........................ 525/327.4 |
| 4,070,152 | 1/1978 | Pentz ....................................... 8/115.6 |
| 4,075,237 | 2/1978 | Kleiner et al. .......................... 526/242 |
| 4,100,225 | 7/1978 | Mueller et al. ......................... 525/324 |
| 4,151,069 | 4/1979 | Rossi ....................................... 208/33 |
| 4,192,930 | 3/1980 | Beck et al. ............................... 525/227 |
| 4,240,916 | 12/1980 | Rossi ........................................ 252/56 |
| 4,255,299 | 3/1981 | Daimon et al. ....................... 525/327.5 |
| 4,871,823 | 10/1989 | Billman et al. ........................ 526/272 |
| 4,925,906 | 5/1990 | Green et al. ............................ 526/245 |
| 5,001,004 | 3/1991 | Fitzgerald et al. ...................... 428/263 |
| 5,346,726 | 9/1994 | Pechhold ............................. 427/393.4 |
| 5,349,038 | 9/1994 | Plischke et al. ........................ 528/150 |
| 5,358,769 | 10/1994 | Pechhold .................................. 428/96 |
| 5,408,010 | 4/1995 | May ....................................... 526/248 |
| 5,427,859 | 6/1995 | May .................................... 525/327.5 |

FOREIGN PATENT DOCUMENTS

| | | |
|---|---|---|
| 0 383 310 A | 8/1990 | European Pat. Off. . |
| 0 391 711 A | 10/1990 | European Pat. Off. . |
| 0 609 456 A | 8/1994 | European Pat. Off. . |
| 0 632 157 A | 1/1995 | European Pat. Off. . |
| 2 671 090 A | 7/1992 | France . |
| 19 18 079 | 10/1969 | Germany . |
| 20 65 071 A | 3/1972 | Germany . |
| 60 14718 A | 8/1985 | Japan . |
| WO 92/10605 | 6/1992 | WIPO . |
| WO A 92 15748 A | 9/1992 | WIPO . |

Primary Examiner—Melvyn I. Marquis

[57] ABSTRACT

A composition of partial esters or thioesters formed from copolymers of maleic anhydride and perfluoroalkyl alcohols or perfluoroalkyl thiols is disclosed, and a process for providing soil and stain resistance to fibers by application of such partial esters or thioesters.

19 Claims, No Drawings

PARTIAL FLUOROESTERS OR THIOESTERS OF MALEIC ACID POLYMERS AND THEIR USE AS SOIL AND STAIN RESISTS

FIELD OF THE INVENTION

The present invention comprises partial esters or hioesters of maleic acid polymers useful as soil and stain resists for polyamide, silk, and wool fibers such as used in carpeting.

BACKGROUND OF THE INVENTION

Polyamide, silk, and wool fibers are subject to soiling. Several of the currently used soil resist agents for nylon carpets are based on polymers derived from perfluoroalkylethyl alcohols. Typically the perfluoroalkylethyl alcohol derivatives are incorporated into acrylic or urethane polymers for application by padding or spraying to various substrates.

Additionally, polyamides, silk, and wool fibers are subject to staining by a variety of agents, particularly acid dyes such as FD&C Red Dye No. 40, commonly found in soft drinks. Various stain resist agents have been used, including the sulfonated phenol formaldehyde condensates and polycarboxylic acids such as those derived from methacrylic acid or maleic acid. Such stain resist agents can be used alone or in combination.

Usually the stain resist agents are applied from aqueous medium under conditions of controlled pH. The affinity or exhaust of the stain resist agents are the highest below pH of 3. Often surfactants are used to help solvate the stain resist agents at low pH.

On the other hand, while the fluorochemical soil resist agents are effective in protecting the fiber from soil, they offer little protection from stains caused by acid dyes. Since the fluorochemical soil resist agents do not exhaust from aqueous solutions, they are usually applied in a separate operation from stain resists by either spraying, padding or foaming followed by a drying step. Co-application of the stain resist and soil resist would be more economical. However, we have found that co-application of conventional stain resists and soil resists do not provide the desired properties.

Numerous patents have been issued on uses and compositions of esters of hydrocarbon alcohols with maleic anhydride polymers. Certain partial esters of fluoroalkyl alcohols with maleic anhydride copolymers have been disclosed as antistatic treatment of plastic films, detergent stabilizers, and additives for floor polishes and surfactants. Fluorine-containing itaconic acid derivatives in organic solvents have been taught as finishes for fibrous materials. Fluoroalkyl substituted phenol/formaldehyde condensates as stainblockers for nylon fibers are presently known for a one-step soil and stain resist. Maleic acid polymers have been proposed as stain resist agents for nylon fibers.

It is desirable to have a choice of agents conferring both soil and stain resistance and which can be applied to fibers in a single step. This invention describes an agent that provides both soil and stain resistance and which can be applied in a one-step application.

SUMMARY OF THE INVENTION

This invention is directed to the composition of new partial esters or thioesters formed from copolymers of maleic anhydride and perfluoroalkyl alcohols or perfluoroalkyl thiols (hereinafter termed "partial esters or thioesters") and a process for providing soil and stain resistance to fibers, in particular, silk, wool, and polyamides such as nylon, by the application of the partial esters or thioesters to such fibers and fabrics constructed from them.

The present invention comprises a composition comprising a copolymer having units of formula II

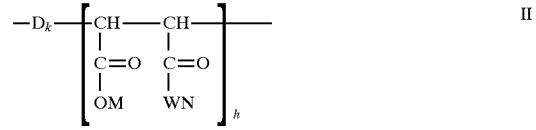

wherein
D is a vinyl monomer selected from the group consisting of styrene, vinyl ether, and alpha olefin;
M is H, alkali metal or ammonium cation;
W is O, S or a mixture thereof;
N is a mixture of R' and R" in a molar ratio of M:R':R" of [1−(e+g)]:e:g;
R' is $R_f$—$A_d$—B
$R_f$ is a fully fluorinated straight or branched aliphatic radical which can be interrupted by at least one oxygen atom;
A is a divalent radical selected from the group consisting of —SO$_2$N(R)—, —CON(R)—, —S—, and —SO$_2$— wherein R is
H or a $C_1$ to $C_6$ alkyl radical;
d is 0 or 1;
B is a divalent linear hydrocarbon radical —$C_nH_{2n}$— optionally end-capped by —(O—CH$_2$—CH$_2$)$_z$—, —(O—CH$_2$—CH(CH$_3$))$_z$—, or —(O—CH$_2$—CH(CH$_2$Cl))$_z$— wherein n is 2 to 12 and z is 0 to 50;
R" is either a $C_1$ to $C_{30}$ alkyl group or a polysiloxane group of formula III

wherein
j is 5 to 20;
e is 0.1 to 1.0;
g is 0 to 0.5;
h is 3 to 1000; and
k is 3 to 1000.

The present invention further comprises a process for providing soil and stain resistance to polyamide, silk and wool fibers comprising application of an effective amount of the composition of formula II as defined above.

The present invention further comprises a process for the preparation of the composition of formula II as defined above comprising reacting a maleic anhydride copolymer with a perfluoroalkyl alcohol or perfluoroalkyl thiol of formula I

wherein
$R_f$ is a fully fluorinated straight or branched liphatic radical which can be interrupted by at least one oxygen atom;
A is a divalent radical selected from the group consisting of —SO$_2$N(R)—, —CON(R)—, —S—, and —SO$_2$— wherein R is H or a $C_1$ to $C_6$ alkyl radical;
d is 0 or 1;
B is a divalent linear hydrocarbon radical —$C_nH_{2n}$— optionally end-capped by —(O—CH$_2$—CH$_2$)$_z$—, —(O—CH$_2$—CH(CH$_3$))$_z$— or —(O—CH$_2$—CH(CH$_2$Cl))$_z$— wherein n is 2 to 12 and z is 0 to 50; and U is O or S.

DETAILED DESCRIPTION OF THE INVENTION

This invention is directed to new compositions and the process for their one-step application to fibers, in particular, silk, wool, or polyamides such as nylon, and producer-colored nylon (where the color is a pigment incorporated in the fiber during spinning), to provide both soil and stain resistance. Such compositions can also be used in situations requiring only or primarily stain resistance, or in situations requiring only or primarily soil resistance. The new compositions are partial esters or thioesters of formula II detailed below and which are formed from copolymers of maleic anhydride and perfluoroalkyl alcohols or perfluoroalkyl thiols of the formula I

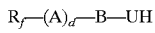      I wherein
  $R_f$ is a fully fluorinated straight or branched aliphatic radical which can be interrupted by oxygen atoms,
  A is a divalent radical selected from —SO$_2$N(R)—, —CON(R)—, —S—, or —SO$_2$—, wherein R is H or a C$_{1-6}$ alkyl radical,
  d is zero or 1,
  B is a divalent linear hydrocarbon radical —C$_n$H$_{2n}$— which can be optionally end-capped by —(O—CH$_2$—CH$_2$)$_z$—, —(O—CH$_2$—CH(CH$_3$))$_z$—, —(O—CH$_2$—CH(CH$_2$Cl))$_z$—, wherein n is 2 to 12, and z is 0 to 50; and
  U is O or S.

Preferably, $R_f$ contains at least 1 and not more than 30 carbon atoms. More preferably $R_f$ contains at least 4 and not more than 16 carbon atoms. For B, n is preferably 2 and z is preferably 1 to 15.

Representative fluoroaliphatic alcohols or perfluoroalkyl thiols wherein U is as previously defined that can be used in the esterification with maleic anhydride polymers are:

C$_m$F$_{(2m+1)}$—(CH$_2$)$_n$—UH wherein
  m is 3 to 14 and n is 2 to 12;

(CF$_3$)$_2$—CF—O—(CF$_2$—CF$_2$)$_p$—CH$_2$—CH$_2$—UH wherein
  p is 1 to 5;

C$_m$F$_{(2m+1)}$—CON(R)—(CH$_2$)$_q$—UH wherein
  R is H or a C$_{1-6}$ alkyl radical, q is 1 to 12, and m is 3 to 14; and C$_m$F$_{(2m+1)}$—SO$_2$N(R)—(CH$_2$)$_q$—UH wherein
  R, m, and q are as described above.

The composition of the partial ester or thioester copolymers of this invention is shown by the following schematic formula II, which shows the structure of the monomer units in the copolymer, but not their sequence:

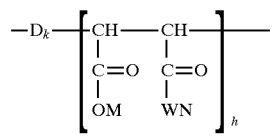      II wherein
  D is a vinyl monomer selected from the group styrene, vinyl ether, or alpha olefin;
  M is H, alkali metal or ammonium cation;
  W is O, S or a mixture thereof;
  N is a mixture of R' and R" in a molar ratio of M:R':R" of [1–(e+g)]:e:g,
  R' is R$_f$—(A)$_d$—B—;
  $R_f$, A d, and B are as previously defined in formula I;
  R" is either a C$_1$ to C$_{30}$ alkyl group and preferably C$_8$ to C$_{18}$, or a polysiloxane group of formula III

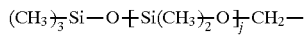      III wherein
  j is 5 to 20 and preferably 10 to 16;
  e is 0.1 to 1.0 and preferably 0.2 to 0.6;
  g is 0 to 0.5 and preferably 0 to 0.3;
  h is 3 to 1000 and preferably 5 to 30; and
  k is 3 to 1000 and preferably 5 to 30.

The maleic anhydride copolymers are prepared from maleic anhydride, with one or more monomers selected from the group consisting of alpha-olefins, dienes, aromatic olefins, and alkyl vinyl ethers. The number average molecular weight (M̄n) of the copolymers can range between 500 to 200,000 and preferably 1,500 to 5,000. Chain transfer agents such as toluene, xylene, ethylbenzene, cumene, methylene chloride, chloroform, carbon tetrachloride, carbon tetrabromide, ethylene dichloride, or hydrocarbon mercaptans can be used to control the molecular weight of the polymers.

Formation of the partial esters or thioesters of this invention are limited to one mole or less of ester or thioester group per mole of maleic anhydride by limiting the amount of fluoroalcohol or fluorothiol accordingly. Preferably less than 0.65 mole of fluoroalcohol or fluorothiol per mole of maleic anhydride is used to yield less than 0.65 mole of ester or thioester per mole of maleic anhydride. More preferably 0.05–0.3 moles of fluoroalcohol or fluorothiol per mole of maleic anhydride is used to yield 0.05–0.3 mole of ester or thioester per mole of maleic anhydride. The partial esters or thioesters may be applied to fibers from aqueous acidic solutions in a one-step application.

Esterifications of maleic anhydride polymers with perfluoroalkyl alcohols or thiols of the type R$_f$—(A)$_d$—B—UH wherein U is O or S require the presence of catalysts, such as triethylamine, p-toluenesulfonic acid, and others generally known in the art. Limiting the ester formation to 1 mole or less (a maximum of one mole) per mole of maleic anhydride, allows for sufficient residual carboxylic groups necessary for solubility and bonding to the fiber substrate. A part of the perfluoroalkyl alcohols or perfluoroalkyl thiols can be replaced by hydrocarbon or siloxane alcohols. The resulting compounds can easily be converted to water soluble products under mild alkaline conditions.

Such partial esters or thioesters of maleic acid copolymers with perfluoroalkyl alcohols or perfluoroalkyl thiols (compositions of formula II) provide both stain and soil resistance to polyamide, silk or wool fibers when applied from aqueous acidic solutions in a one-step application.

The partial esters or thioesters are applied onto textiles and carpets by various methods well know in the art, such as by exhaust from an acidic aqueous bath as practiced in the Beck dyeing of carpets or by addition to an aqueous dye bath solution and exhaustion concurrently with the dye. They may also be applied during continuous dyeing such as with "Kuster" or "Otting" carpet dyeing equipment. Other suitable methods include, but are not limited to, padding, foam, or spray application. In a second embodiment, aqueous solutions of the fluoroalkyl maleic acid copolymer partial esters or thioesters can be co-applied with other commercial polycarboxylic stain resists based on methacrylic acid or maleic acid. Such co-application can use mixtures containing 5% to 95% fluoroalkyl maleic acid copolymer partial esters or thioesters.

The quantities of the stain/soil resists of this invention that are applied to the fiber or fabric are amounts effective in imparting stain and soil resistance. Such concentrations can be readily determined by those skilled in the art by using test methods which are well-known in the art, such as those set forth hereinbelow. For example, the stain/soil resists can be applied at a concentration in the range between 0.1 and 5.0% based on the weight of fiber or fabric (owf), preferably between 0.3 and 2.0% owf.

The pH of the application bath can range between 1.5 and 9. However, a pH range equal or less than 4 is required for exhausting the partial esters or thioesters onto the substrate. A lower pH of 2 to 3 is preferred. A surfactant is required for applications below pH 3 to provide for homogenous, stable aqueous bath solutions. The required amount of surfactant can be determined by one skilled in the art by observing the aqueous system in which it is used. Usually an amount of 10 to 100%, and preferably 20 to 50k, surfactant based on the amount of active ingredients of the stain/soil resists will be sufficient to retain homogenous bath solutions. Surfactants which can be used for this application include alpha-olefin sulfonates such as "Witconate" AOS (Witco Corp., Greenwich, Conn.), "Calsoft" (Pilot Chemical Co., Avenel, N.J.), sodium lauryl sulfonate such as "Duponol" (Witco Corp.), and alkylated disulfonated diphenyl oxide such as "Dowfax" (Pilot Chemical Co.) and "Calfax" (Cytec Industries, Stamford, Conn.). Mono- or polyvalent electrolytes, such as sodium sulfate and magnesium nitrate or sulfate may be added in amounts of 0.01 to 1% on the weight of the bath to improve the exhaust of the stain/soil resists.

Exhaust or fixation of the stain/soil resists can be accomplished at bath or solution temperatures ranging from 20° to 100° C. over a period of a few seconds to one hour, preferably 50° to 85° C. for 5 seconds to 5 minutes. Often the thus treated fiber or fabric is steamed and/or heat treated to allow for optimum performance. The herein described stain/soil resists can also be applied directly via a finish during fiber spinning, twisting or heat setting operation. The stain/soil resists of this invention can also be applied in situ to polyamide or wool carpeting which has already been installed in a dwelling place, office or other location. They can be applied as a simple aqueous preparation or in the form of aqueous shampoo preparation, with or without one or more polyfluoroorganic oil-,water-, and/or soil- repellent materials.

In addition to being highly effective as stain and soil resists on fibers and textiles, the partial fluoroesters or fluorothioesters of the present invention can also be used in inks, powder coatings, paints, as paper sizing materials, and pigment dispersants.

APPLICATION AND TEST METHODS

Application Method

A white cut-pile carpet (5 g) constructed from 29 oz./square yard Superba-set BCF nylon 6/6 was treated in a laboratory Beck-type apparatus for 10 minutes at 80° C. at a 20:1 liquor-to-goods ratio with a solution of a stain resist agent (stain resist agents are described in the examples) at a pH of 2 to give an application load of 0.8k of weight fiber (owf) based on active ingredients. To the bath was occasionally added 2.0 g per liter of MAGNAFLO (an aqueous solution of magnesium nitrate). A surfactant (0.02 g) such as DOWFAX 2A-4 or WITCONATE AOS was added before pH adjustment. The carpet was then rinsed under tap water, partially de-watered by squeezing and dried in an forced-air oven for about 20 minutes at 121° C. (250° F.).

Stain Test

A carpet specimen (1.5×3.5 inch) was placed pile up on a flat non-absorbent surface. Ten ml of an aqueous red dye solution (0.1 g Red Dye No. 40 and 3.2 g citric acid in a volume of 1 liter) was poured into a 1-inch diameter cylinder which was tightly placed over the specimen. The cylinder was removed after all the liquid had been absorbed. The stained carpet specimen was left undisturbed for 2 hours, after which it was rinsed thoroughly under cold tap water and squeezed dry. The color of the specimen was measured with a Minolta Chroma Meter CR 200 available from Minolta Corporation, Ramsey, N.J. by determining the color difference "Delta a" between unstained and stained carpet samples. This method provides a highly accurate way to measure the degree of red stain of the carpet. The higher the "Delta a", the redder the stain. Results for control and example stain tests are shown in Tables 1 and 2 below.

Accelerated Soil Test (Drum Test)

Carpet specimens (1.5×3.5 inch) were mounted pile up with a 2-sided adhesive tape onto the inside of a metal drum (8 inch diameter) until the inside surface was completely covered by carpet. Into the drum was then placed a volume of 250 ml of dirty SURLYN ionomer resin pellets, made by blending 1-liter volume SURLYN 8528 ionomer resin (from E. I. du Pont de Nemours and Company, Wilmington, Del.) pellets with 20 g of synthetic soil (AATCC Method 123-1988), and 250 ml volume of 5/16 inch ball bearings. The drum was then closed and rolled on a roller-type drum mill for 3 minutes. The carpet samples were then removed from the drum and cleaned with a canister-type vacuum cleaner.

The degree of soiling was measured with a Minalto Chroma Meter CR 200 by determining the difference in darkness as "Delta E" between the unsoiled control and the soiled carpet sample. The higher the "Delta E", the darker the sample. Differences of two "Delta E" units are visually distinguishable. Results for control and example soil tests are shown in Tables 1 and 2 below.

COMPOUNDS USED

Polymer I (1-Octene/Maleic Anhydride Copolymer)

A solution of 220.5 g (2.25 moles) of maleic anhydride, 177 g (1.58 moles) of 1-octene and 5 g of dodecylmercaptan in 400 g of methyl isobutyl ketone was heated under agitation and nitrogen to 95° C. T-butyl peroctoate initiator (15 ml) was added via a syringe pump over a 6 hour period. After holding the temperature for 20 hours at 95° C., another portion of initiator (2 ml) was added. The product (hereinafter called "Polymer I") was cooled and discharged after gas chromatographic (GC) analysis indicated completion of reaction. A small amount (22.5 g) of the product was stripped to dryness at 80°–85° C. under reduced pressure (13–20 Pa) and gave a brittle, amber resin having a number average molecular weight, Mn, value of 2150 and a ratio of MW/Mn of 2.15 by gel permeation chromatography (polystyrene standard).

CONTROL EXAMPLES

Table 1 shows the performance of Control Examples A through D as stain resist agents. Table 2 shows the performance of Control Example E.

Control A

An isobutylene/maleic anhydride copolymer (25 g) having a molecular weight of 5,000 to 8,000, commercially available as ISOBAM 600 from Kuraray Company, Japan, was hydrolyzed by adding it to a solution of 6.5 g of sodium hydroxide in 68.5 g of deionized water. The mixture was agitated at 70° C. until all the polymer had dissolved to a clear solution containing 25% of active ingredients.

Control B

A solution of 29.4 g (0.3 mole) of maleic anhydride, 24.2 g (0.216 mole) of 1-octene and 0.6 g of 1-dodecanethiol in 75 g of methyl isobutyl ketone was heated under agitation and nitrogen to 95° C. T-butyl peroctoate (6 ml) initiator was added over a 3 hour period via a syringe pump. No maleic anhydride was detected by GC analysis after 21 hours. The resulting polymer (57 g) was then isolated by removing the volatiles at 80°–90° .C under reduced pressure (10–20 Pa). The amber, brittle resin melted at 115°–125° C. and had a number average molecular weight of 1736 and a ratio of MW/Mn of 1.95 by gel permeation chromatography (polystyrene standard). A part of the above polymer (25 g) was hydrolyzed at 85° C. with 30% sodium hydroxide (12 g) in 63 g of deionized water and gave a clear aqueous solution containing 25% of active ingredients.

Control C

A styrene/maleic anhydride copolymer (25 g), commercially available as SMA Resin 1000 from Atochem North America Inc., 3 Parkway, Philadelphia, Pa. was dissolved by heating at 70°–80° C. in a solution of 4.2 g of sodium hydroxide in 70.8 g of deionized water for 6 hours. The resulting clear solution contained 25k of active ingredients.

Control D

A solution of 19.6 g (0.2 mole) of maleic anhydride and 20 g (0.2 mole) of n-butyl vinyl ether in 120 g of cumene was heated under agitation and nitrogen to 70° C. VAZO 67 initiator, 0.6 g, 2,2'-azobis(2-methylbutyronitrile), from E. I. du Pont de Nemours and Company, Wilmington, Del. in 10 g of cumene was added within 2 hours via a syringe pump to this solution. The temperature during the addition reached 85° C. and an insoluble material started to form. The reaction mass was agitated at 70° C. for another 20 hours before being poured into 300 ml of methanol. A white solid (40.5 g) was separated by filtration and dried in a vacuum oven at 80° C. This brittle polymer melted between 160°–175° C. and had a number average molecular weight of 9,893 and a ratio of MW/Mn of 1.33 by gel permeation chromatography (polystyrene standard). A part of the polymer (16.4 g) was dissolved in 45 g of methyl isobutyl ketone at 75° C. Sodium hydroxide (10.7 g of a 30% solution) in 60 ml of deionized water were added to the agitated solution. After heating for 3 hours at 75° C., the methyl isobutyl ketone was removed at reduced pressure (40–80 Pa) and gave a slightly hazy aqueous solution containing 14% of active ingredients.

Control E "Polymer I" (22.5 g) was hydrolyzed by heating under agitation for 3 hours at 75° C. with a solution of 30 t sodium hydroxide (9.5 g) in 95 g of deionized water. The methyl isobutyl ketone was removed at reduced pressure (200–300 Pa). Finally the active ingredients concentration of the clear, amber solution was adjusted to 16% with deionized water.

EXAMPLES

Table 1 compares the performance of Examples 1 through 4 as stain resist agents versus nonfluorinated Control Examples A through D. Table 2 compares the performance of the conventional nonfluorinated stain resist of Control Example E and stain resists of the present invention having different levels of fluoroesters, and fluoresters combined with nonfluorinated esters.

Example 1

An isobutylene/maleic anhydride copolymer (25.8 g containing ca. 16.4 g maleic anhydride, equivalent to 0.167 mole) having a molecular weight of 5,000–8,000 and commercially available as ISOBAM 600 from Kuraray Co., Japan was dissolved at 85° C. in 70 g of dimethyl sulfoxide. To the solution was then added 2.9 g of mixed fluoroalcohols of the formula $F—(CF_2—CF_2)_s—CH_2—CH_2—OH$, where s is predominately 3, 4, and 5, with an apparent molecular weight of 488. The reaction mass was agitated for 65 hours at 85° C. after the addition of 0.2 g p-toluenesulfonic acid catalyst. The solution was then poured into an acetone/water mixture to precipitate the polymer. The crude polymer was further purified by washing with an acetone/water mixture, and dried under vacuum (20 Pa) at 65° C. giving a brittle resin melting between 290° and 295° C. and containing 4.2% of fluorine. This indicated that 59% of the fluoroalcohol was incorporated in the polymer. The above resin (8 g) was then reacted at 65° C. with a solution of 30 t sodium hydroxide (5 g) in 19 g of deionized water and gave a turbid, amber solution. Filtration gave a clear solution containing approximately 24% of active ingredients and 0.22% of fluorine. Performance of this compound as a stain resist agent is shown in Table 1.

Example 2

1-octene/maleic anhydride copolymer (25 g) as described in Control B (containing 12 g of maleic anhydride equivalent to 0.1229 mole) was dissolved at 75° C. in 50 g of methyl isobutyl ketone. To the solution was added 5.2 g (0.0112 mole) of a mixture of fluoroalcohols of the formula $F—(CF_2—CF_2)_s—CH_2—CH_2—OH$ where s is predominately 3, 4, 5, and having an apparent molecular weight of 463. The esterification was catalyzed by the addition of 0.1 ml of triethylamine. After heating for 20 hours at 75° C. a solution of 30% sodium hydroxide (12 g) in 100 g of deionized water was added and heating was continued at 60° C. for 4 hours. The accompanying methyl isobutyl ketone was then removed at reduced pressure (40–80 Pa) and gave a clear aqueous solution containing 21.6% of active ingredients and 2.3% of fluorine. This indicated that about 4.5 g (86%) of the fluoroalcohol was incorporated. Performance of this compound as a stain resist agent is shown in Table 1.

Example 3

Styrene/maleic anhydride resin (25 g, containing 11 g maleic anhydride equivalent to 0.112 mole), commercially available as SMA resin 1000 from Elf Atochem North America Inc., Philadelphia, Pa. was dissolved in 50 g of methyl isobutyl ketone at 75° C. To the clear solution was added 5.2 g (0.0112 mole) of a mixture of fluoroalcohols of the formula $F-(CF_2-CF_2)_s-CH_2-CH_2-OH$ where s is predominately 3, 4, and 5 and having an apparent molecular weight of 463. The esterification was catalyzed by the addition of 0.1 ml of triethylamine. A solution of 30% sodium hydroxide (12 g) in 100 g of deionized water was added to the reaction product after 24 hours and agitation was continued at 65° C. for 3 hours. The accompanying methyl isobutyl ketone was then removed at 60° C. under reduced pressure (40–80 Pa) and gave a slightly hazy aqueous solution containing 18.7% of active ingredients and 1.7% of fluorine. This indicated that only 3.8 g (73%) of fluoroalcohol was incorporated. Performance of this compound as a stain resist agent is shown in Table 1.

Example 4

N-butyl vinyl ether/maleic anhydride copolymer (23.1 g, containing 11.1 g maleic anhydride equivalent to 0.113 mole) as described in Control D was dissolved in 59.6 g of methyl isobutyl ketone at 75° C. To this solution was added 5.2 g (0.0113 mole) of a mixture of fluoroalcohols of the formula $F-(CF_2-CF_2)_s-CH_2-CH_2-OH$ where s is predominately 3, 4, and 5 and having an apparent molecular weight of 463. The esterification was catalyzed by the addition of 0.15 ml of triethylamine. To the reaction product was added after 25 hours a solution of 30% sodium hydroxide (12 g) in 80 g of deionized water and agitation was continued at 65° C. for 4 hours. The accompanying methyl isobutyl ketone was then removed at 60° C. under reduced pressure (40–80 Pa) and gave a hazy aqueous solution containing 10.8% of active ingredients and 1.2% of fluorine. This indicated that 4.4 g (85%) of the fluoroalcohol was incorporated. Performance of this compound as a stain resist agent is shown in Table 1.

Example 5

To a reaction vessel equipped with a reflux condenser, a mechanical stirrer, a thermometer, and with a nitrogen inlet, were charged 90 g of "Polymer I" (containing 24.14 g maleic anhydride equivalent to 0.246 mole), 11.4 g (0.0246 mole) of 1H,1H,2H,2H-perfluorodecanol and 10 g of dry methyl isobutyl ketone. The mixture was heated to 75° C. under agitation and nitrogen. To the clear amber solution was added 0.1 ml of triethylamine catalyst. The conversion to ester was monitored by GC analysis of precipitated samples from FREON 113 (1,1,2-trichlorotrifluoroethane)/cyclohexane (3:1). FREON 113 is available from E.I. du Pont de Nemours and Company, Wilmington, Del. Four hours later another portion of catalyst was added (0.05 ml). After 21 hours GC analysis indicated 7.6% of residual 1H,1H,2H,2H-perfluorodecanol. The reaction product was cooled and 15.3 g was stripped at 80°–85° C. and 13–20 Pa to dryness and gave 8.1 g of an amber, brittle resin with a melting point range of 140°–153° C. and containing 12.6k of fluorine.

The remaining product (81.8 g) was reacted with a solution of 30% sodium hydroxide (14.3 g) in 95 g deionized water at 60° C. for 3 hours. The methyl isobutyl ketone was then removed at reduced pressure (40–80 Pa) and gave after further dilution with deionized water a clear, amber solution (301.5 g, pH 5.4) containing 14.2% active ingredients and 1.6% of fluorine (found by analysis). This corresponded to approximately 0.092 mole of 1H,1H,2H,2H-perfluorodecanol per mole of maleic anhydride.

Example 6

"Polymer I" (90 g, containing 24.14 g maleic anhydride equivalent to 0.246 mole) was reacted with 17.1 g (0.0369 mole) of 1H,1H,2H,2H-perfluorodecanol in 10 g of methyl isobutyl ketone in a similar manner as described in Example 5 after the addition of 0.3 ml of triethylamine. After heating for 44 hours at 75° C., GC analysis indicated 6.7% residual 1H,1H,2H,2H-perfluorodecanol. A part of the product (41.6 g) was stripped to dryness resulting in an amber, brittle resin (23.0 g) having a melting range of 137°–147° C. and containing 18.2% of fluorine.

The major portion of the product (63.6 g) was heated at 60° C. with 30% sodium hydroxide (17.2 g) in 100 g of deionized water. The accompanying methyl isobutyl ketone solvent was then removed at reduced pressure (40–80 Pa) and the concentration of the active ingredients adjusted to 25%, and resulted in a clear, amber solution of pH 6.9 containing 4.4% of fluorine (found by analysis). This corresponded to 0.14 mole of 1H,1H,2H,2H-perfluorodecanol per mole of maleic anhydride.

Example 7

"Polymer I" (90 g, containing 24.14 g maleic anhydride equivalent to 0.246 mole) was reacted with 22.8 g (0.049 mole) of 1H,1H,2H,2H-perfluorodecanol in 10 g methyl isobutyl ketone in the presence of 0.25 ml of triethylamine in similar fashion as described in Example 5. GC analysis after 45 hours indicated 9.7% of residual 1H,1H,2H,2H-perfluorodecanol. A part of the product (23.1 g) was stripped to dryness at reduced pressure (13–20 Pa) and resulted in an amber, brittle resin (13.3 g) melting between 137°–147° C. and containing 21.2% of fluorine. The major part of the product (83.3 g) was heated for 3 hours at 60° C. with a solution of 30% sodium hydroxide (21.5 g) in 100 g of deionized water. After the removal of the accompanying methyl isobutyl ketone at reduced pressure (40–80 Pa) the concentration of the resulting clear, amber solution was adjusted to 25% active ingredients. The fluorine concentration was found to be 4.9%. This corresponded to 0.18 mole of 1H,1H,2H,2H-perfluorodecanol per mole of maleic anhydride.

Example 8

"Polymer I" (90 g, containing 24.14 g maleic anhydride equivalent to 0.246 mole) was reacted with 45.6 g (0.0984 mole) of 1H,1H,2H,2H-perfluorodecanol in 10 g of methyl isobutyl ketone in the presence of 0.8 ml of triethylamine in a similar fashion as described in Example 5. GC analysis after 67 hours indicated 9.2% of residual 1H,1H,2H,2H-perfluorodecanol. A part of the product (36.7 g) was stripped to dryness under reduced pressure (13–20 Pa), and resulted in an amber, brittle resin (23.5 g), melting between 133°–144° C. and containing 33.9% of fluorine. The major part of the product (94.2 g) was heated for 3 hours at 60° C. with a solution of 30% sodium hydroxide (17.8 g) in 100 g of deionized water. A hazy, viscous solution resulted after the removal of the accompanying methyl isobutyl ketone at reduced pressure (40–80 Pa). After standing overnight at room temperature a small amount of an insoluble material (1.5 g) had separated at the bottom of the reaction vessel above a clear, amber solution containing approximately 16% of active ingredients. The fluorine concentration was found to be 5.2%. This corresponded to 0.36 mole of 1H,1H,2H,2H-perfluorodecanol per mole of maleic anhydride.

Example 9

"Polymer I" (45 g, containing 12.07 g maleic anhydride equivalent to 0.123 mole) was reacted with 45.6 g (0.0984 mole) of 1H,1H,2H,2H-perfluorodecanol in 15 g of methyl isobutyl ketone in the presence of 0.6 ml of triethylamine in a similar fashion as described in Example 5. GC analysis after 42 hours indicated 22.9% of unreacted 1H,1H,2H,2H-perfluorodecanol. Additional triethylamine catalyst (0.2 ml) only slightly reduced the fluoroalcohol concentration to 21.8% after 66 hours. This seemed to indicate that no further esterification took place under these conditions and the reaction was terminated. A part of the product (29.3 g) was stripped to dryness at 80°–85° C. under reduced pressure (13–20 Pa) resulting in an amber, brittle resin melting between 124°–133° C. and containing 42.0% of fluorine. The major part of the product (62.0 g) was reacted for 4 hours at 60° C. with a solution of 30% sodium hydroxide (3.6 g) in 100 g of deionized water. A milky solution resulted after the removal of the accompanying methyl isobutyl ketone at reduced pressure (40–80 Pa). After standing overnight at room temperature considerable solids separated at the bottom of the reaction vessel. Centrifugation of the liquid gave rise to a milky solution containing approximately 4.6% active ingredients. The fluorine concentration was found to be 2.0%. This corresponded to approximately 0.625 mole of 1H,1H,2H,2H-perfluorodecanol per mole of maleic anhydride.

Example 10

"Polymer I" (90 g, containing 24.14 g maleic anhydride equivalent to 0.246 mole) was reacted with 11.4 g of 1H,1H,2H,2H-perfluorodecanol (0.0246 mole), 6.6 g of octadecyl alcohol (0.0246 mole) in 10 g of methyl isobutyl ketone in the presence of 0.4 ml of triethylamine catalyst in similar fashion as described in Example 5. No 1H,1H,2H, 2H-perfluorodecanol was detected by GC analysis after 40 hours at 75° C.

A part of the product (36 g) was stripped to dryness at reduced pressure (13–20 Pa) and gave an amber, brittle resin (20 g) which melted at between 119°–129° C. and contained 12.4% of fluorine. The major part of the product (74.3 g) was reacted for 3 hours at 60° C. with a solution of 30% sodium hydroxide (18.5 g) in 120 g of deionized water. After removal of the accompanying methyl isobutyl ketone at reduced pressure, the concentration of the resulting clear, amber solution was adjusted to 25% active ingredients. The fluorine content was found to be 3.1%.

Example 11

"Polymer I" (90 g, containing 24.14 g maleic anhydride equivalent to 0.246 mole) was reacted with 11.4 g of 1H,1H,2H,2H-perfluorodecanol (0.0246 mole) and 10.5 g (0.008 mole) of polysiloxane monocarbinol (Mn OH=~1310 available from Huels America, Piscataway, N.J.) in 10 g of methyl isobutyl ketone in the presence of 0.4 ml of triethylamine catalyst in similar fashion as described in Example 5. No 1H,1H,2H,2H-perfluorodecanol was detected by GC analysis after 23 hours at 75° C. A part of the product (54.4 g) was stripped to dryness at reduced pressure (13–20 Pa) and resulted in a amber, brittle resin which melted between 105°–120° C. and contained 14.0% of fluorine and 2.4% of silicon.

The major part of the product (76.4 g) was reacted with 30% sodium hydroxide (16.1 g) in 130 g of deionized water at 60° C. for 4 hours. After removal of the accompanying methyl isobutyl ketone at reduced pressure, the concentration of of the clear, amber solution was adjusted to 25% of active ingredients. The fluorine content was found to be 3.5%.

TABLE 1

Performance of Carpet Treated with Partial Fluoroesters of Maleic Acid Copolymers

| Carpet Treated with | Maleic Acid Copolymer | ppm Fluorine (found) | Staining "Delta a" | Soiling "Delta E" |
|---|---|---|---|---|
| Untreated | | — | 34.2 | 25.4 |
| Control A | Isobutylene | — | 5.6 | 23.1 |
| Example 1 | Isobutylene | 220 | 5.7 | 21.6 |
| Control B | 1-octene | — | 0 | 18.4 |
| Example 2 | 1-octene | 220 | 2.0 | 13.5 |
| Control C | Styrene | — | 1.4 | 18.4 |
| Example 3 | Styrene | 250 | 1.0 | 15.8 |
| Control D | Butyl vinyl ether | — | 0.3 | 17.1 |
| Example 4 | Butyl vinyl ether | 310 | 0 | 11.4 |

TABLE 2

Performance of Carpet Treated with Partial Fluoroesters of 1-Octene/Maleic Acid Copolymers

| Carpet Treated with | ppm Fluorine (found) | Staining "Delta a" | Soiling "Delta E" |
|---|---|---|---|
| Untreated | 0 | 34.5 | 26.5 |
| Control E | 0 | 0.2 | 24.8 |
| Example 5 | 490 | 2.3 | 22.6 |
| Example 6 | 580 | 1.8 | 18.0 |
| Example 7 | 600 | 5.0 | 14.8 |
| Example 8 | 530 | 15.2* | 16.5 |
| Example 9 | 840 | 25.9* | 22.5 |
| Example 10 | 420 | 5.7 | 21.7 |
| Example 11** | 430 | 2.0 | 19.5 |

*Tip Staining.
**Found 390 PPM Silicon based of weight of treated fiber.

What is claimed is:

1. A composition comprising a copolymer having units of formula

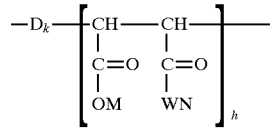

wherein

D is a vinyl monomer selected from the group consisting of styrene, vinyl ether, and alpha olefin;

M is H, alkali metal or ammonium cation;

W is O, S or a mixture thereof;

N is a mixture of R' and R" in a molar ratio of M:R':R" of $\{1-(e+g)\}$:e:g;

R' is $R_f$—Ad—B—;

$R_f$ is a fully fluorinated straight or branched aliphatic radical which can be interrupted by at least one oxygen atom;

A is a divalent radical selected from the group consisting of —$SO_2N(R)$—, —$CON(R)$—, —S—, and —$SO_2$— wherein R is H or a $C_1$ to $C_6$ alkyl radical;

d is 0 or 1;

B is a divalent linear hydrocarbon radical —$C_nH_{2n}$— optionally endcapped by —(O—$CH_2$—$CH_2$)$_z$—, —(O—$CH_2$—CH($CH_3$))$_z$ or —(O—$CH_2$—CH($CH_2$Cl))$_z$— wherein n is 2 to 12 and z is 0 to 50;

R" is either a $C_1$ to $C_{30}$ alkyl group or a polysiloxane group of the formula III

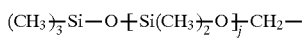 III wherein
 j is 5 to 20;
 e is 0.1 to 1.0;
 g is 0 to 0.5;
 h is 3 to 1000; and
 k is 3 to 1000,
wherein said composition has less than about 0.65 mole of ester group per mole of maleic anhydride group and provides soil resistance and resistance to staining by acid dyes to fibers.

2. The composition of claim 1 wherein $R_f$ is an aliphatic radical having from about 1 to about 30 carbon atoms.

3. The composition of claim 2 wherein for B, n is 2 and z is 1 to 15.

4. The composition of claim 3 wherein R" is a $C_8$ to $C_{18}$ alkyl group.

5. The composition of claim 3 wherein R" is a polysiloxane group of formula III wherein j is 5 to 20.

6. The composition of claim 4 or 5 wherein e is 0.2 to 0.6, g is 0 to 0.3, h is 5 to 30, and k is 5 to 30.

7. The composition of claim 1 having from about 0.05 to about 0.3 mole of ester group per mole of maleic anhydride group.

8. A process comprising application in a single step to fibers of an effective amount of the composition of formula II

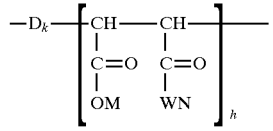 II wherein
 D is a vinyl monomer selected from the group consisting of styrene, vinyl ether, and alpha olefin;
 M is H, alkali metal or ammonium cation;
 W is O, S or a mixture thereof;
 N is a mixture of R' and R" in a molar ratio of M:R':R" of $[1-(e+g)]$:e:g;
 R' is $R_f$—Ad—B—;
 $R_f$ is a fully fluorinated straight or branched aliphatic radical which can be interrupted by at least one oxygen atom;
 A is a divalent radical selected from the group consisting of
 —$SO_2N(R)$—, —$CON(R)$—, —S—, and —$SO_2$— wherein R is H or a $C_1$ to $C_6$ alkyl radical;
 d is 0 or 1;
 B is a divalent linear hydrocarbon radical —$C_nH_{2n}$— optionally endcapped by —(O—$CH_2$—$CH_2$)$_z$—, —(O—$CH_2$—CH($CH_3$))$_z$ or —(O—$CH_2$—CH($CH_2$Cl))$_z$— wherein n is 2 to 12 and z is 0 to 50;
 R" is either a $C_1$ to $C_{30}$ alkyl group or a polysiloxane group of the formula III

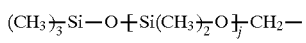 III wherein
 j is 5 to 20;
 e is 0.1 to 1.0;
 g is 0 to 0.5;
 h is 3 to 1000; and
 k is 3 to 1000,
said process providing soil resistance and resistance to staining by acid dyes to said fibers.

9. The process of claim 8 wherein the effective amount of the composition of formula II is from about 0.1 by weight to about 5% by weight of the fiber or fabric.

10. The process of claim 8 wherein the composition of formula II is applied as an aqueous acidic solution.

11. The process of claim 10 wherein the acidic solution contains a surfactant.

12. The process of claim 8 wherein the composition of formula II is applied simultaneously with at least one other polycarboxylic stain resist.

13. A process comprising topical application in situ to a carpet of an effective amount of a composition of formula II

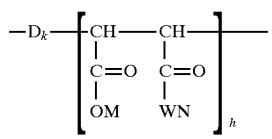 II wherein
 D is a vinyl monomer selected from the group consisting of styrene, vinyl ether, and alpha olefin;
 M is H, alkali metal or ammonium cation;
 W is O, S or a mixture thereof;
 N is a mixture of R' and R" in a molar ratio of M:R':R" of $[1-(e+g)]$:e:g;
 R' is $R_f$—$A_d$—B—;
 $R_f$ is a fully fluorinated straight or branched aliphatic radical which can be interrupted by at least one oxygen atom;
 A is a divalent radical selected from the group consisting of
 —$SO_2N(R)$—, —$CON(R)$—, —S—, and —$SO_2$— wherein R is H or a $C_1$ to $C_6$ alkyl radical;
 d is 0 or 1;
 B is a divalent linear hydrocarbon radical —$C_nH_{2n}$— optionally endcapped by —(O—$CH_2$—$CH_2$)$_z$—, —(O—$CH_2$—CH($CH_3$))$_z$ or —(O—$CH_2$—CH($CH_2$Cl))$_z$— wherein n is 2 to 12 and z is 0 to 50;
 R" is either a $C_1$ to $C_{30}$ alkyl group or a polysiloxane group of the formula III

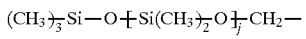 III wherein
 j is 5 to 20;
 e is 0.1 to 1.0;
 g is 0 to 0.5;
 h is 3 to 1000; and
 k is 3 to 1000,
said process providing soil resistance and resistance to staining by acid dyes to said carpet in a single application step.

14. A process for preparation of a composition of formula II

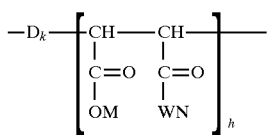

wherein
- D is a vinyl monomer selected from the group consisting of styrene, vinyl ether, and alpha olefin;
- M is H, alkali metal or ammonium cation;
- W is O, S or a mixture thereof;
- N is a mixture of R' and R" in a molar ratio of M:R':R" of $\{1-(e+g)\}$:e:g;
- R' is $R_f$—$A_d$—B—;
- $R_f$ is a fully fluorinated straight or branched aliphatic radical which can be interrupted by at least one oxygen atom;
- A is a divalent radical selected from the group consisting of —$SO_2N(R)$—, —$CON(R)$—, —S—, and —$SO_2$— wherein R is H or a $C_1$ to $C_6$ alkyl radical;
- d is 0 or 1;
- B is a divalent linear hydrocarbon radical —$C_nH_{2n}$— optionally endcapped by —$(O-CH_2-CH_2)_z$—, —$(O-CH_2-CH(CH_3))_z$— or —$(O-CH_2-CH(CH_2Cl))_z$— wherein n is 2 to 12 and z is 0 to 50;
- R" is either a $C_1$ to $C_{30}$ alkyl group or a polysiloxane group of the formula III

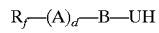 III wherein
- j is 5 to 20;
- e is 0.1 to 1.0;
- g is 0 to 0.5;
- h is 3 to 1000; and
- k is 3 to 1000, comprising reacting a maleic anhydride copolymer in the presence of a catalyst with a perfluoroalkyl alcohol or perfluoroalkyl thiol of formula I

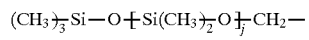

wherein
- $R_f$ is a fully fluorinated straight or branched aliphatic radical which can be interrupted by at least one oxygen atom;
- A is a divalent radical selected from the group consisting of —$SO_2N(R)$—, —$CON(R)$—, —S—, and —$SO_2$— wherein R is H or a $C_1$ to $C_6$ alkyl radical;
- d is 0 or 1;
- B is a divalent linear hydrocarbon radical —$C_nH_{2n}$— optionally end-capped by —$(O-CH_2-CH_2)_z$—, —$(O-CH_2-CH(CH_3))_z$— or —$(O-CH_2-CH(CH_2Cl))_z$— wherein n is 2 to 12 and z is 0 to 50; and
- U is O or S, wherein ester formation is limited to less than 0.65 mole of ester group per mole of maleic anhydride group.

15. The process of claim 14 wherein the perfluoroalkyl alcohol or perfluoroalkyl thiol is selected from the group consisting of $C_mF_{(2m+1)}$—$(CH_2)_n$—UH wherein m is 3 to 14 and n is 2 to 12; $(CF_3)_2$—CF—O—$(CF_2-CF_2)_p$—$CH_2$—$CH_2$—UH wherein p is 1 to 5; $C_mF_{(2m+1)}$—CON(R)—$(CH_2)_q$—UH wherein R is H or a $C_1$ to $C_6$ alkyl radical, U is O or S, q is 1 to 12, and m is 3 to 14; and $C_mF_{(2m+1)}$—$SO_2N(R)$—$(CH_2)_q$—UH wherein R, U, m and q are as defined above.

16. The process of claim 14 wherein the maleic anhydride copolymer is prepared from maleic anhydride and at least one monomer selected from the group consisting of alphaolefins, dienes, aromatic olefins, and alkyl vinyl ethers, said copolymer having a number average molecular weight of from about 800 to about 150,000.

17. The process of claim 14 wherein a portion of the perfluoroalkyl alcohol or perfluoroalkyl thiol is replaced with hydrocarbon or siloxane alcohol to limit ester formation to less than 0.65 mole per mole of maleic anhydride.

18. A fiber to which has been applied a composition of formula II

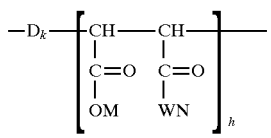

wherein
- D is a vinyl monomer selected from the group consisting of styrene, vinyl ether, and alpha olefin;
- M is H, alkali metal or ammonium cation;
- W is O, S or a mixture thereof;
- N is a mixture of R' and R" in a molar ratio of M:R':R" of $\{1-(e+g)\}$:e:g;
- R' is $R_f$—Ad—B—;
- $R_f$ is a fully fluorinated straight or branched aliphatic radical which can be interrupted by at least one oxygen atom;
- A is a divalent radical selected from the group consisting of —$SO_2N(R)$—, —$CON(R)$—, —S—, and —$SO_2$— wherein R is H or a $C_1$ to $C_6$ alkyl radical;
- d is 0 or 1;
- B is a divalent linear hydrocarbon radical —$C_nH_{2n}$— optionally endcapped by —$(O-CH_2-CH_2)_z$—, —$(O-CH_2-CH(CH_3))_z$— or —$(O-CH_2-CH(CH_2Cl))_z$— wherein n is 2 to 12 and z is 0 to 50;
- R" is either a $C_1$ to $C_{30}$ alkyl group or a polysiloxane group of the formula III

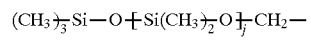 III wherein
- j is 5 to 20;
- e is 0.1 to 1.0;
- g is 0 to 0.5;
- h is 3 to 1000; and
- k is 3 to 1000, said composition having less than about 0.65 mole of ester group per mole of maleic anhydride group, and said composition providing soil resistance and resistance to staining by acid dyes to the fiber in a single application step.

19. The fiber of claim 18 selected from the group consisting of nylon, silk or wool.

* * * * *